May 2, 1939. D. L. CLOSSON ET AL 2,156,946
SAFETY SWITCH
Filed Feb. 15, 1938 2 Sheets-Sheet 1

Inventors
Donald L. Closson
Bruce H. Closson
By Carl Miller
Attorney

May 2, 1939.  D. L. CLOSSON ET AL  2,156,946
SAFETY SWITCH
Filed Feb. 15, 1938  2 Sheets—Sheet 2
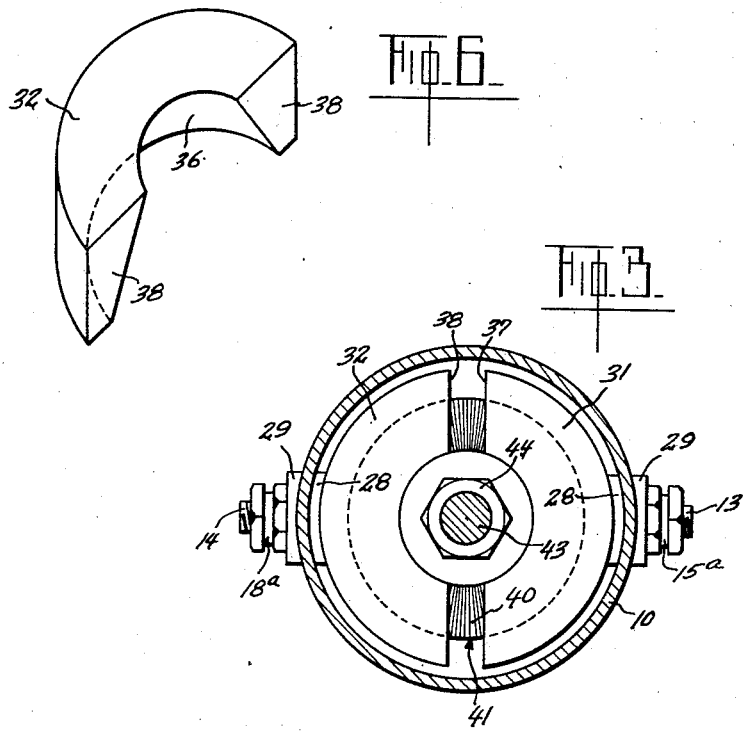
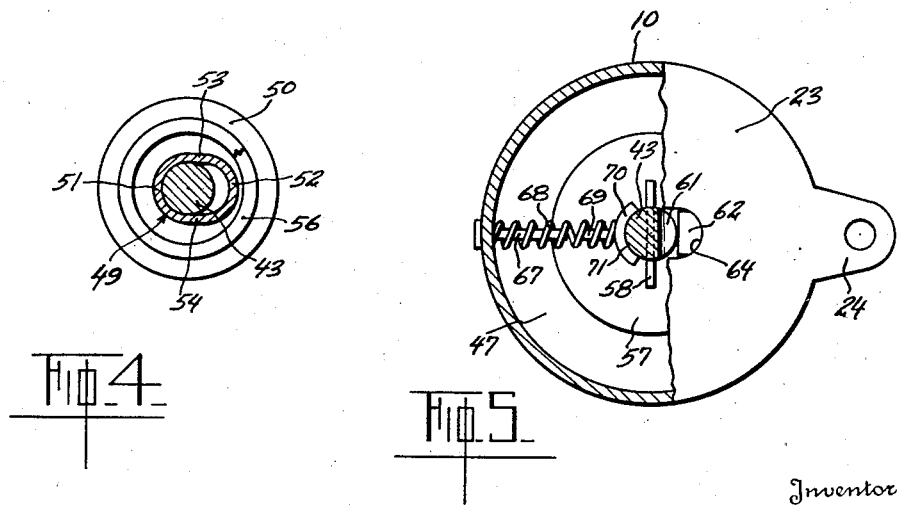
Inventor
Donald L. Closson
Bruce H. Closson
By Carl Miller
Attorney Patented May 2, 1939

2,156,946

UNITED STATES PATENT OFFICE 2,156,946

SAFETY SWITCH

Donald Lester Closson and Bruce H. Closson, Benton Harbor, Mich.

Application February 15, 1938, Serial No. 190,588

2 Claims. (Cl. 200—169)

This invention relates to a safety switch for use in the electrical system of an automobile, aeroplane, motor-boat or any other conveyance wherein an electrical system is employed.

The primary object of this invention is to provide a safety switch in the ground connection of the battery operable at will whereby the operator may easily and quickly break or open the connection to reduce the liability of fires from short circuits, theft of the machine, and current leakage when the automobile is parked or housed, thus preventing running down of the battery; such a safety switch to be preferably mounted under the floor boards of the automobile and within easy reach of the foot of the operator.

With the foregoing and other objects in view, the invention consists of the novel construction, combination and arrangement of parts as hereinafter more particularly described, and as illustrated in the accompanying drawings wherein is shown a preferred embodiment of the invention, but it is to be understood that such drawings and description are to be taken as illustrative and that the invention is intended to be limited only by the scope of the claims hereunto appended.

In the accompanying drawings in which like numerals are employed to designate like parts throughout the same:

Figure 3 is a transverse sectional view of the safety switch taken on line 3—3, Figure 2.

Figure 4 is a detail sectional view taken on line 4—4, Figure 2.

Figure 5 is a plan view partly in section of the safety switch taken on line 5—5, Figure 2.

Figure 6 is a perspective view of one of the copper contact seats.

Figure 1:
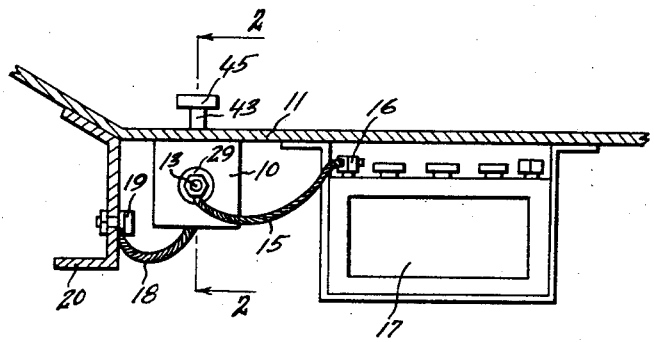
Figure 1 shows in elevation the safety switch mounted on the floor boards of an automobile and inserted in the ground connection of the battery.

Referring to the drawings in detail, 10 indicates generally the safety switch housing mounted in any suitable position beneath the floor boards 11 of an automobile body. Projecting outwardly of the housing 10 are two binding posts 13 and 14, to be hereinafter described; a battery cable section 15 connecting the binding post 13 to the ground terminal post 16 of the battery 17, and another battery cable section 18 connecting the other binding post 14 to a ground connection 19 at a suitable frame member 20 of the automobile chassis.

The safety switch housing 10 is in the form of a metallic cylinder having a lower wall 22, a top wall 23 and ears 24 for mounting the same through the medium of the bolts 25 to the floor boards 11. Either or both the top or bottom walls may be removably attached in any desired manner to the cylinder wall of the housing 10 to permit the assembly and adjustment of the switch parts therein.

Figure 2:
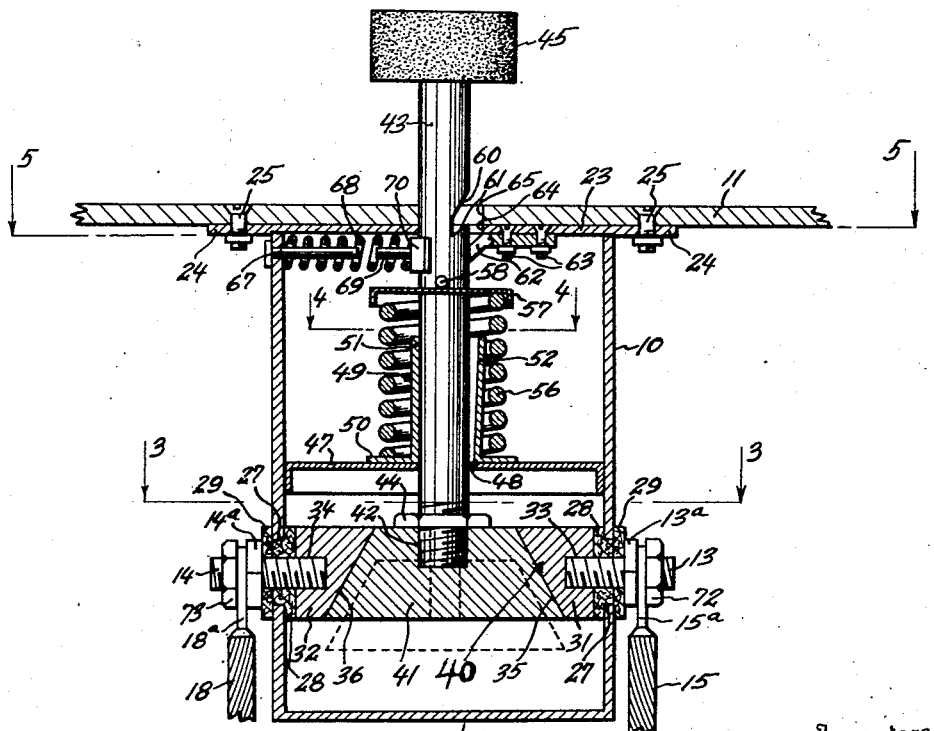
Figure 2 is a vertical sectional view of the safety switch taken on line 2—2, Figure 1.

Formed in the cylinder wall of the housing 10 diametrically opposite each other are openings 27 equally spaced from the bottom wall 22 and in each of which are fitted the abutting washers 28, 29 made of fibre or any other suitable insulating material. Threadedly inserted through one set of washers is the binding post 13 in the form of a copper threaded bolt, and in a like manner the other set of washers carry a like binding post 14, as clearly shown in Figure 2. Arranged within the housing 10 are two opposed substantially semi-circular identical copper contact seats 31 and 32, each having a cylindrical outer wall and each provided centrally therein with a threaded opening 33 and 34 respectively into which the inner ends of the binding posts 13 and 14 are respectively threaded for firmly supporting said contact seats, in the manner clearly shown. Nuts 13a, 14a on the binding posts 13 and 14 securely clamp the contact seats and associated washers to the wall of the housing 10. The contact seats 31 and 32 are solid throughout, have flat upper and lower sides and are each formed with a contact surface 35 and 36, respectively. The end faces 37 and 38 of the contact seats are as shown in Figure 3 in spaced opposed relation in vertical parallel planes, and the outer cylindrical walls are spaced from the cylindrical inside wall of the housing 10 in concentric relation thereto, and insulated therefrom by the insulating washers 28 and 29. Both the contact surfaces 35 and 36 are formed complemental to the conical surface 40 of the solid copper contact block 41 which has the shape of a truncated cone so that when the contact block 41 is seated on the contact seats 31 and 32 the contact surfaces 35 and 36 will entirely engage the conical surface 40. Both the contact seats 31, 32 and contact block 41 are of equal thickness.

Formed centrally in the top of the contact block 41 is a threaded opening 42 adapted to receive the lower threaded end of a vertical steel stem 43 provided with a lock nut 44 for fixedly attaching the same to the contact block. The length of the stem 43 is such as to project above the floor boards 11, and carries at its upper end a rubber button 45. Thus movement of the stem 43 up or down will carry with it the contact block 41 to engage or disengage the contact seats 31 and 32.

Above the contact seats 31 and 32 is a partition 47 fixedly attached in any desired manner to the wall of the housing 10 and is provided with a central opening 48 through which the stem 43 extends. Surrounding the stem 43 is a guide sleeve 49 having a flange 50 at its lower end, said guide sleeve having a rear semi-circular vertical wall 51 and a front semi-circular inwardly inclined wall 52 joined by flat side walls 53 and 54 tangent thereto, see Figure 4, whereby to provide a larger opening at the top of the guide sleeve than at the bottom to allow for a forward tilting of the stem 43 for a purpose to be hereinafter described. The width of the opening in the guide sleeve 49, is such as to snugly engage the stem 43 as to prevent lateral movement thereof. Seated on the flange 50 of the guide sleeve 49 which may be fixed to the partition 47 in any desired manner, is a coil spring 56 which encircles said guide sleeve 49, the upper end of said spring engaging a spring seat or cap 57 mounted on the stem 43 and retained in position by the pin 58, the spring being held under a slight initial compression whereby the force exerted thereby on the stem 43 will act to hold the contact block 41 seated on the contact seats 31 and 32, as clearly shown in Figure 2.

Formed on the side of the stem 43, opposite the wall 52 of the guide sleeve 49 is a notch 60 provided with a shoulder 61 arranged to be engaged by a locking lug 62 secured by the bolts 63 to the underside of the top 23 of the housing 10. In the normal position of the parts shown in Figure 2, the lug 62 rides on the stem 43 and is located slightly below the notch 60, the position of the same on the stem 43 being at a suitable point beneath the button 45. The openings 64, 65, respectively in the top 23 and floor boards 11 through which the stem 43 extends are elongated and slightly larger than the top opening of the guide sleeve 49.

Beneath the top 23 of the housing 10 and carried by the wall thereof is a horizontal guide pin 67 which carries a locking coil spring 68, the outer end of which abuts the wall of the housing 10. The inner end of the spring 68 surrounds the stem 69 of a follower 70 provided with a curved face 71 engaging the stem 43. The locking coil spring 68 is under compression tending to urge the stem 43 forwardly which movement is prevented by the lug 62.

The terminal ends 15a and 18a respectively of the battery cable sections 15 and 18 are connected to the respective binding posts 13 and 14 and are secured thereon by the lock outs 72 and 73.

The operation of the safety switch is as follows:—

When the automobile is in operation the safety switch is closed, the contact block 41 being seated on the contact seats 31 and 32 to thus provide the ground connection from the battery 17 to the frame member 20. Should the vehicle be parked, or placed in a garage, the electrical system of the automobile is rendered inoperative by the simple expedient of opening the safety switch which breaks the ground connection. This is accomplished by the operator who pushes downwardly on the button 45 either by hand or by foot. Upon a predetermined downward movement of the stem 43, the notch 60 thereon will come into registry with the locking lug 62, whereby the stem 43 under the action of the locking spring 68 will be tilted and pushed forwardly so that the lug 62 will enter the notch 60, whereupon the shoulder 61 will engage the lug 62 and under the action of the spring 56 will affect a locking engagement of the stem 43 by the lug 62. This downward movement of the stem 43 to its locked position will of course carry with it the contact block 41 out of engagement with the contact seats 31, 32 to the dotted line position shown in Figure 2, to thus break the ground connection. Release of the stem 43 is affected by merely kicking the same to the rear to bring the notch 60 away from the lug 62, and under the action of the spring 56, the stem will be forced upwardly to bring the contact block 41 into seating engagement with the contact seats 31 and 32 to thus close the ground connection.

In the event of a short circuit or accident the safety switch can be opened to render the electrical system inoperative thus preventing fire or explosion. When the automobile is parked, theft thereof is impossible as when the safety switch is open the ignition part of the electrical system cannot function. Also when the automobile is placed in a garage, should there be a slight leakage, by opening the safety switch the battery will not run down.

Having thus described our invention, we claim as new and desire to secure by Letters Patent:

1. In a safety switch, a casing having a vertically moving stem therein carrying at its lower end a contact element, a supporting partition and a tubular guide sleeve mounted thereon through which said stem extends for vertical movement therethrough, said guide sleeve having a rear vertical wall normally engaging said stem, side walls spaced apart a distance equal to the width of said stem and a downwardly and inwardly inclined front wall spaced from the adjacent side of said stem whereby the opening at the top of said guide sleeve is larger than the one at the bottom, said stem being adapted for a forward tilting movement in said guide sleeve.

2. In a safety switch, a casing having a vertically moving stem therein carrying at its lower end a contact element, a locking mechanism for said stem comprising a notch in said stem providing a shoulder, a lug adapted to engage said shoulder arranged beneath said notch and normally in engagement with said stem, said lug being fixed to a part of said casing, a horizontal supporting pin fixed to said casing and facing the side of said stem opposite to that engaged by said lug, a compression coil spring mounted on said supporting pin, a follower carried by the free end of said coil spring, said follower having a curved face engaging said stem, the arrangement and construction being such that when said stem is moved downwardly to a point where the notch and lug come into registry, said stem is tilted forwardly under the action of said coil spring whereby said shoulder will engage said lug to effect a locking engagement of said stem with said lug.

DONALD LESTER CLOSSON.
BRUCE H. CLOSSON.